US012576959B2

(12) United States Patent　　　　　(10) Patent No.:　US 12,576,959 B2
Gilbertson et al.　　　　　　　　　　(45) Date of Patent:　　Mar. 17, 2026

(54) MULTIPIECE RIBS FOR AIRCRAFT WING

(71) Applicant: The Boeing Company, Arlington, VA (US)

(72) Inventors: Michael L. Gilbertson, Arlington, WA (US); Stephen P. Watkins, Marysville, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/826,524

(22) Filed: Sep. 6, 2024

(65) Prior Publication Data

US 2026/0070649 A1　　Mar. 12, 2026

(51) Int. Cl.
　B64C 1/12　　　　(2006.01)
　B64C 3/18　　　　(2006.01)
　B64F 5/10　　　　(2017.01)
(52) U.S. Cl.
　CPC ............... B64C 1/12 (2013.01); B64C 3/185 (2013.01); B64C 3/187 (2013.01); B64F 5/10 (2017.01)
(58) Field of Classification Search
　CPC ........... B64C 3/185; B64C 3/187; B64C 3/26; B64C 1/12; B21D 28/06; B23P 17/00
　See application file for complete search history.

(56) References Cited

U.S. PATENT DOCUMENTS

| | | | | |
|---|---|---|---|---|
| 4,356,616 | A * | 11/1982 | Scott | ....................... B64C 3/187 52/84 |
| 8,186,622 | B2 * | 5/2012 | Munday | .................... B64C 3/26 244/129.1 |

| | | | | |
|---|---|---|---|---|
| 9,944,402 | B2 * | 4/2018 | Perez Diaz | ............. B64C 3/187 |
| 10,279,922 | B2 * | 5/2019 | Perez Diaz | ............. B64C 3/187 |
| 10,745,103 | B2 * | 8/2020 | Trop | ......................... B64C 3/26 |
| 11,001,363 | B2 * | 5/2021 | Linton | ...................... B64F 5/10 |
| 11,273,899 | B2 * | 3/2022 | Achtner | ............... B29C 70/302 |
| 11,623,731 | B2 * | 4/2023 | Trop | ...................... B64C 3/187 244/123.1 |
| 2009/0272848 | A1 * | 11/2009 | Munday | .................... B64C 3/18 244/131 |
| 2009/0282668 | A1 | 11/2009 | Sanchez-Brunete | |

(Continued)

FOREIGN PATENT DOCUMENTS

| | | |
|---|---|---|
| EP | 3241739 | 11/2017 |
| WO | WO 2008/012569 | 1/2008 |

OTHER PUBLICATIONS

Extended European Search Report for EP App. No. 25185565.6-1009, dated Sep. 18, 2025.

*Primary Examiner* — Philip J Bonzell
(74) *Attorney, Agent, or Firm* — Joseph M. Butscher; Carroll, Hoette & Butscher, LLC

(57)　　　　　　ABSTRACT

A wing assembly includes an upper wing skin, a lower wing skin, and ribs extending between an upstream spar and a downstream spar with the upper wing skin and the lower wing skin at least partially enclosing the ribs. Each of the ribs includes a first rib portion having an upper wing skin engagement surface and a first rib engagement surface located on an opposite side of the first rib portion for the upper wing skin engagement surface and a second rib portion having a lower wing skin engagement surface and a second rib engagement surface. The second rib engagement surface on the second rib portion is secured to the first rib engagement surface on the first rib portion with rib fasteners.

17 Claims, 8 Drawing Sheets

(56) References Cited

U.S. PATENT DOCUMENTS

| | | | |
|---|---|---|---|
| 2011/0147522 A1 | 6/2011 | Williams | |
| 2016/0355273 A1* | 12/2016 | Perez Diaz | B64C 3/34 |
| 2018/0237150 A1* | 8/2018 | Perez Diaz | B64C 3/34 |
| 2018/0346093 A1* | 12/2018 | Trop | B64C 3/187 |
| 2019/0225319 A1* | 7/2019 | Achtner | B29C 53/24 |
| 2020/0148326 A1* | 5/2020 | Linton | B64C 3/185 |
| 2020/0264590 A1 | 8/2020 | Borowicz | |
| 2020/0377193 A1* | 12/2020 | Trop | B64C 3/182 |
| 2022/0153439 A1* | 5/2022 | Jones | B64C 3/187 |

\* cited by examiner

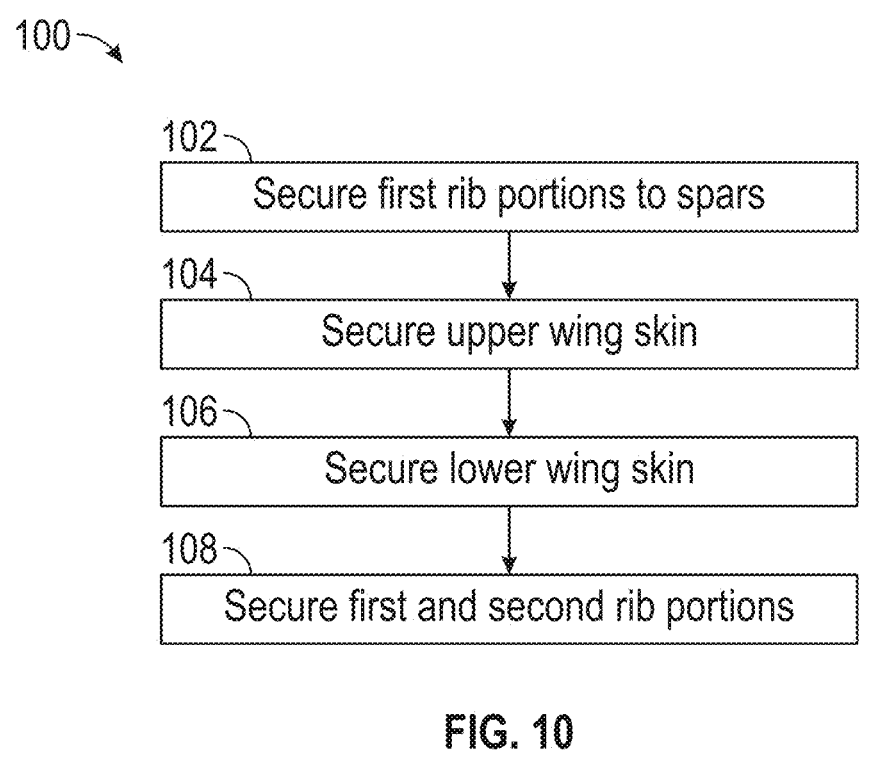

100 ⟍

102 ⟍
| Secure first rib portions to spars |
| --- |

104 ⟍
| Secure upper wing skin |
| --- |

106 ⟍
| Secure lower wing skin |
| --- |

108 ⟍
| Secure first and second rib portions |
| --- |

FIG. 10

MULTIPIECE RIBS FOR AIRCRAFT WING

FIELD

The present disclosure relates generally to aircraft structures and, more specifically, to wings including multipiece ribs.

BACKGROUND

Aircraft wings can be constructed following several different approaches Generally, one or more wing spars running the entire length of the wing are placed and secured in a wing construction jig One or more ribs are attached to the wing spars to give additional support to the wing. After attaching the ribs to the wing spars, a series of wing stringers may be coupled to the wing spars, giving additional structural support as well as providing support to a skin After the installation of one or more other features, such as fuel tanks, electronics, etc., as needed, the aircraft wing skin stiffened with stringers is attached to the wing spars and ribs. The wing skin may be attached using various methods, including, but not limited to, the use of rivets or other fasteners. Thereafter, other aircraft wing components are attached to the wing assembly, such as wing flaps, ailerons attached to an aft spar, as well as forward and aft wing control surfaces.

DESCRIPTION OF THE DRAWINGS

Some embodiments of the present disclosure are now described, by way of example only, and with reference to the accompanying drawings. The same reference number represents the same element or the same type of element on all drawings.

FIG. 10 is a flow diagram of an example method of assembling a wing according to this disclosure.

SUMMARY

Figure 1:
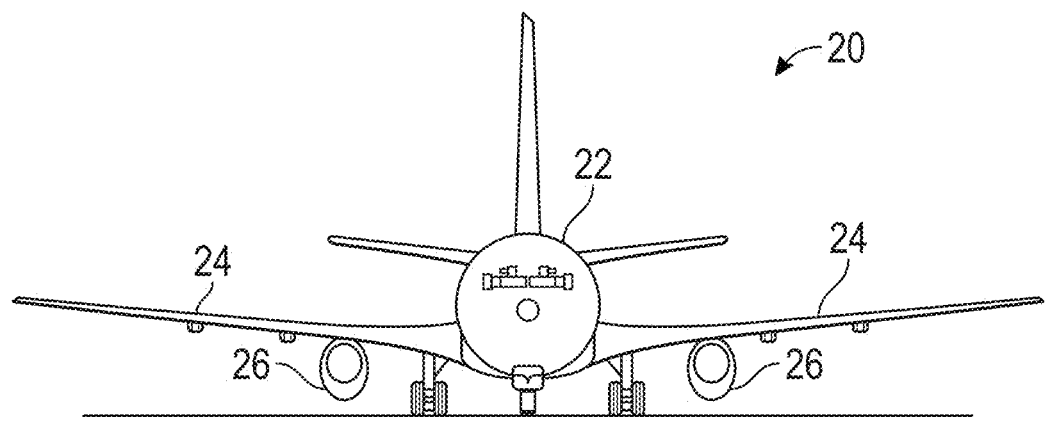
FIG. 1 is a schematic illustration of an example aircraft.

Disclosed herein is a wing assembly. The assembly includes an upper wing skin, a lower wing skin, and ribs extending between an upstream spar and a downstream spar with the upper wing skin and the lower wing skin at least partially enclosing the ribs. Each of the ribs includes a first rib portion having an upper wing skin engagement surface and a first rib engagement surface located on an opposite side of the first rib portion for the upper wing skin engagement surface and a second rib portion having a lower wing skin engagement surface and a second rib engagement surface. The second rib engagement surface on the second rib portion is secured to the first rib engagement surface on the first rib portion with rib fasteners.

In another aspect of the disclosure the upstream spar is fixed to the upper wing skin and the lower wing skin and the downstream spar is fixed relative to the upper wing skin and the lower wing skin.

In another aspect of the disclosure the first rib engagement surface is directly in contact with the second rib engagement surface.

In another aspect of the disclosure the first rib engagement surface and the second rib engagement surface follow a non-linear profile.

In another aspect of the disclosure the first rib engagement surface and the second rib engagement surface are complementary surfaces formed from mechanically separating a single unitary rib into the first rib portion and the second rib portion.

In another aspect of the disclosure the assembly includes a first set of shims between the first rib portion and the upper wing skin.

In another aspect of the disclosure the assembly includes a second set of shims between the second rib portion and the lower wing skin.

In another aspect of the disclosure the lower wing skin includes a set of structural features that extends transversely to the second rib portion and the second rib portion at least partially defines a recess that forms a discontinuity along the lower wing skin engagement surface for accepting a portion of a corresponding one of the set of structural features.

In another aspect of the disclosure the upper wing skin includes a set of structural features that extends transversely to the first rib portion and the first rib portion at least partially defines a recess that forms a discontinuity along the upper wing skin engagement surface for accepting a portion of a corresponding one of the set of structural features.

In another aspect of the disclosure the first rib portion includes a transverse rib aligned with the recess in the second rib portion.

In another aspect of the disclosure the assembly includes fasteners securing the first rib portion to the second rib portion.

Disclosed herein is an airplane. The airplane includes a fuselage, a pair of wings extending from the fuselage each having an upper wing skin, a lower wing skin, and ribs extending between an upstream spar and a downstream spar with the upper wing skin and the lower wing skin at least partially enclosing the ribs. Each of the ribs includes a first rib portion having an upper wing skin engagement surface and a first rib engagement surface located on an opposite side of the first rib portion for the upper wing skin engagement surface and a second rib portion having a lower wing skin engagement surface and a second rib engagement surface. The second rib engagement surface on the second rib portion is secured to the first rib engagement surface on the first rib portion with rib fasteners.

In another aspect of the disclosure the lower wing skin includes a set of structural features that extends transversely to the second rib portion of each of the ribs and the second rib portion of each of the ribs at least partially defines a recess that forms a discontinuity along the lower wing skin engagement surface for accepting a portion of a corresponding one of the set of structural features.

In another aspect of the disclosure the upper wing skin includes a set of structural features that extends transversely to the first rib portion of each of the ribs and the first rib portion of each of the ribs at least partially defines a recess that forms a discontinuity along the upper wing skin engagement surface for accepting a portion of a corresponding one of the set of structural features.

In another aspect of the disclosure the first rib portion includes a transverse rib aligned with the recess in the second rib portion.

Disclosed herein is a method of assembling a wing assembly. The method includes securing first rib portions to an upstream spar and a downstream spar, securing an upper wing skin to an upper skin engagement surface on each of the first rib portions, the upstream spar, and the downstream spar. The method also includes securing a lower wing skin to a lower skin engagement surface on each of a set of second rib portions and securing a first rib engagement surface on each of the first rib portions to a corresponding second rib engagement surface on each of the second rib portions.

In another aspect of the disclosure securing the upper wing skin to the upper skin engagement surface on each of the first rib portions includes shimming the upper wing skin relative to the upper skin engagement surface on each of the first rib portions.

In another aspect of the disclosure securing the lower wing skin to the lower skin engagement surface on each of the f second rib portions includes shimming the lower wing skin relative to the lower skin engagement surface on each of the second rib portions.

In another aspect of the disclosure the method includes securing each of the second rib portions to a corresponding one of a set of strong backs prior to attaching the lower wing skin to the lower skin engagement surface on the second rib portions.

In another aspect of the disclosure forming one of the first rib portions and a corresponding one of the second rib portions from a single unitary rib structure by mechanically separating the single unitary rib structure along a separation rib.

DESCRIPTION

Embodiments of the present disclosure are described herein. It is to be understood, however, that the disclosed embodiments are illustrative examples, and that other embodiments can take various and alternative forms. The Figures are not necessarily drawn to scale and may be schematic. Some features may be exaggerated or minimized to show details of particular components. Therefore, specific structural and functional details disclosed herein are not to be interpreted as limiting, but merely as a representative basis for teaching one skilled in the art to variously employ the present disclosure.

Assembling aircraft wings can be a time-consuming process due to a large number of components needed to form the wing. One feature of this disclosure is to improve the ability to attach upper and lower wing skins to the ribs that form the structural support for the wing. With prior approaches, after one of the upper or lower skin was attached, the other of the upper or lower skin was more difficult to attach due to limited accessibility to the interior of the wing with both skins in place. This disclosure is directed to improving access to attaching wing skins to ribs by forming the wing rib from multiple, such as two, pieces or portions.

FIG. 1 illustrates an example aircraft 20 comprised of a fuselage 22, a pair of wings 24 extending from opposite sides of the fuselage 22, and a pair of engines 26 supported by a corresponding one of the wings 24. Each of the pair of wings 24 are formed from multipiece ribs 50 attached to an upper wing skin 60 and a lower wing skin 64 (FIGS. 3-8) as discussed in greater detail below.

Figure 2:
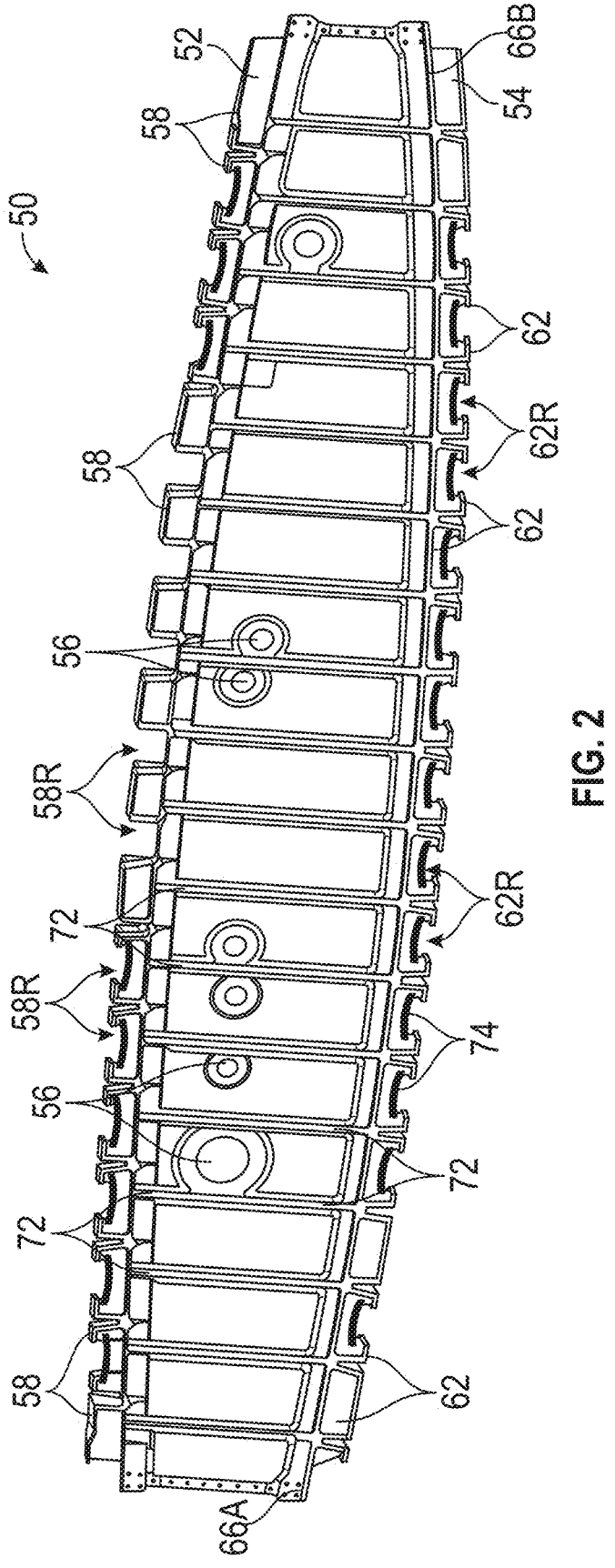
FIG. 2 is a perspective view of an example multipiece rib assembly.

FIG. 2 illustrates one of the multipiece ribs 50 used to form the wing 24. In the illustrated example, each of the ribs 50 are formed from multiple pieces or portions, such as a first rib portion 52 and a second rib portion 54. The first and second rib portions 52 and 54 extend in a chordwise direction from an upstream end to a downstream end and the first rib portion 52 includes multiple openings 56 to accommodate for systems, such as electrical systems, hydraulic systems, etc., to pass through the wing 24 when fully assembled.

In one example, the first and second rib portions 52 and 54 of the rib 50 are formed from a single unitary rib structure that is separated into the first and second rib portions 52 and 54. In one example, the first rib portion 52 and the second rib portion 54 are separated along a separation rib through a mechanical separation process to form complementary surfaces for mating the first rib portion 52 to the second rib portion 54. The mechanical separation process can include one of plasma cutting, electrical discharge machining, or water jet cutting along the separation rib.

In the illustrated example, the separation rib follows a non-linear profile in the chordwise direction of the wing 24. Additionally, the non-linear profile of the separation rib allows for the second rib portion 54 to bave a generally consistent thickness in a direction perpendicular to the lower wing skin 64. This results in the first rib portion 52 having a varying thickness in a direction perpendicular to the upper wing skin 60 to accommodate for a varying thickness of the wing 24.

The mechanical separation of the unitary rib structure forms a first rib engagement surface 68 on a first separation flange 66A on the first rib portion 52 and a second rib engagement surface 70 on a second separation flange 66B on the second rib portion 54. The first and second separation flanges 66A and 66B are formed from the separation rib from the single unitary rib structure used to form the rib 50 into multiple pieces. One feature of the first and second rib engagement surfaces 68, 70 being formed in this manner is the ability for these two surfaces to mate together without the need for additional shims.

Figure 3:
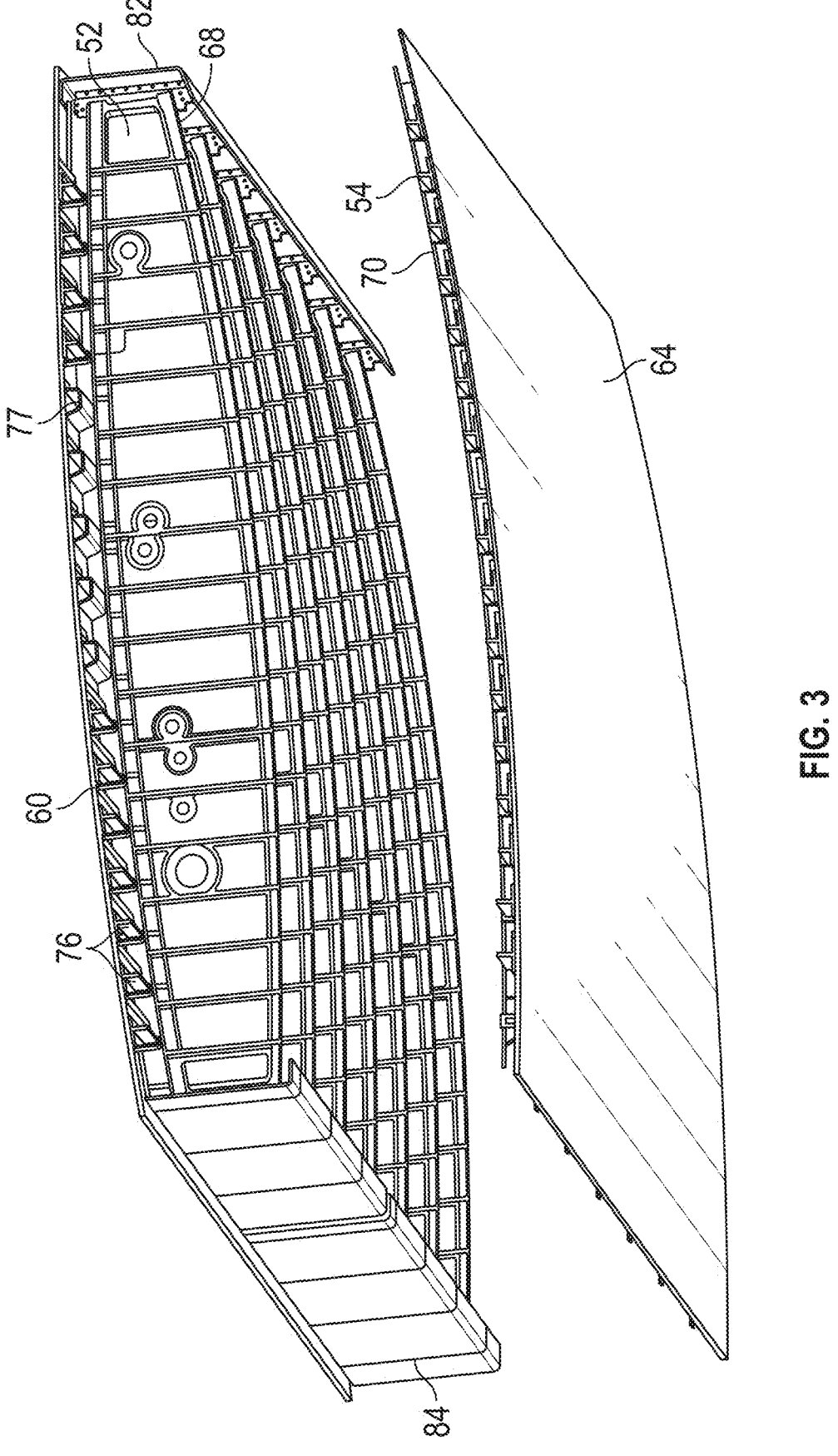
FIG. 3 is a bottom perspective view of an example partially assembled wing for the aircraft of FIG. 1 with a first rib portion separated from a second rib portion.

As shown in FIGS. 2-3, the first rib portion 52 of the rib 50 includes an upper wing skin engagement surface 58 for engaging the upper wing skin 60 (FIG. 3) and the second rib portion 52 includes a lower wing skin engagement surface 62 for engaging a lower wing skin 64 (FIG. 3). The first rib portion 52 includes a first set of structural ribs 72 that extend transversely to a chordwise direction from a body portion of the first rib portion 52. The upper wing skin engagement surface 58 includes multiple segments surrounded by recesses 58R defined at least partially by the first rib portion 52. The recesses 58R can accommodate structural features, such as ribs 76 or channels 77 (FIG. 3), that extend along an inner surface of the upper wing skin 60 in a direction transverse to the second rib portion 54. The upper wing skin 60 is secured to the first rib portion 52 with at least one of fasteners or adhesive. The upper wing skin 60 can also be shimmed relative to the upper wing skin engagement surface 58 on the first rib portion 52 to ensure proper alignment.

The second rib portion 54 includes a first set of structural ribs 74 that extend transversely to a chordwise direction from a body portion of the second rib portion 54. The lower wing skin engagement surface 62 includes multiple segments separated by recesses 62R at least partially defined by the second rib portion 54. The recesses 62R can accommodate structural features, such as ribs 78 on the lower wing skin 64 (FIG. 4), that extend along an inner surface of the lower wing skin 64 in a direction transverse to the second rib portion 54. The lower wing skin 64 is secured to the second wing portion 54 with at least one of fasteners or adhesive. The lower wing skin 64 can also be shimmed relative to the lower wing skin engagement surface 62 on the second rib portion 54 to ensure proper alignment.

Figure 4:
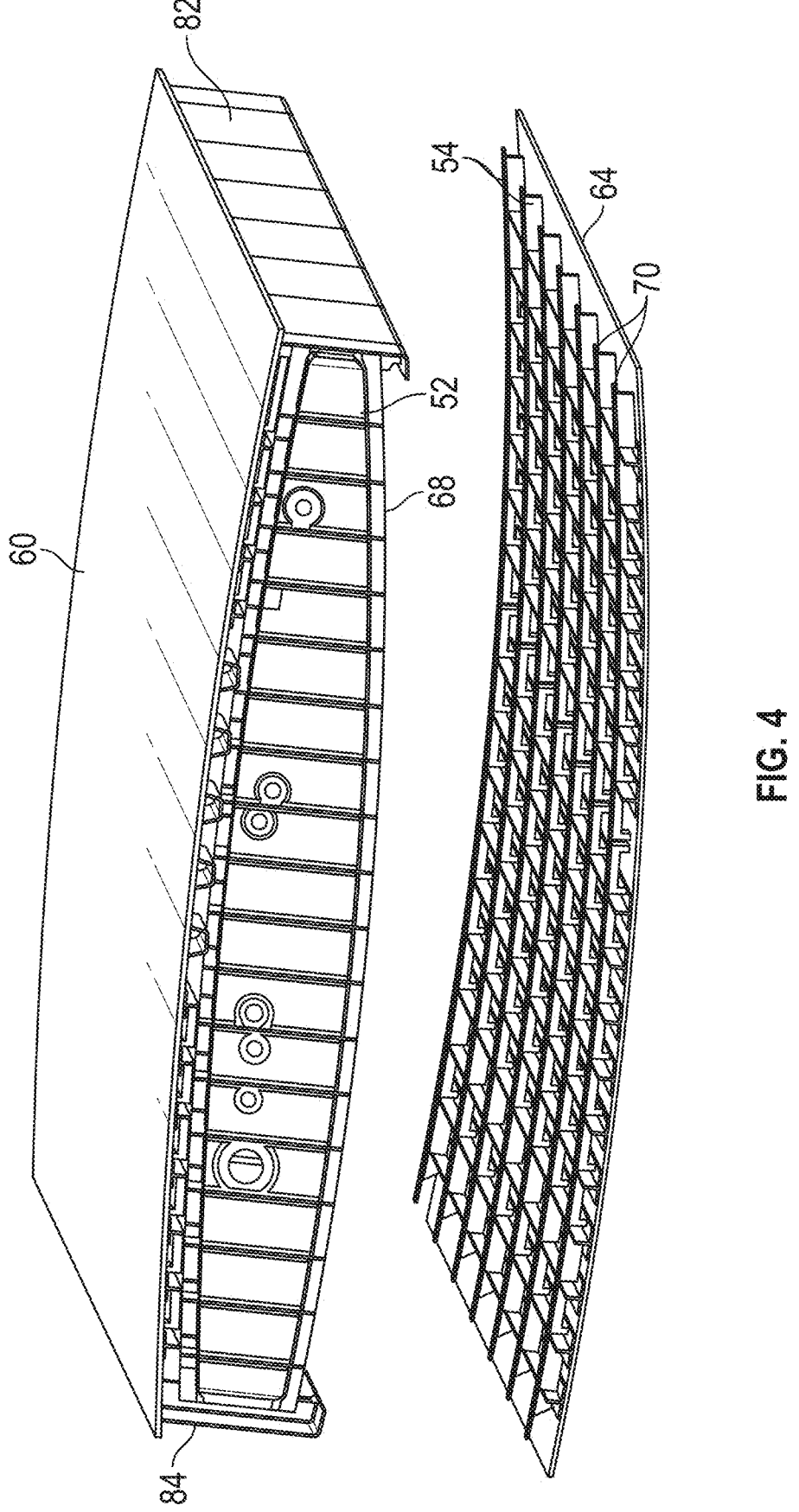
FIG. 4 is a top perspective view of the partially assembled wing of FIG. 3.
Figure 6:
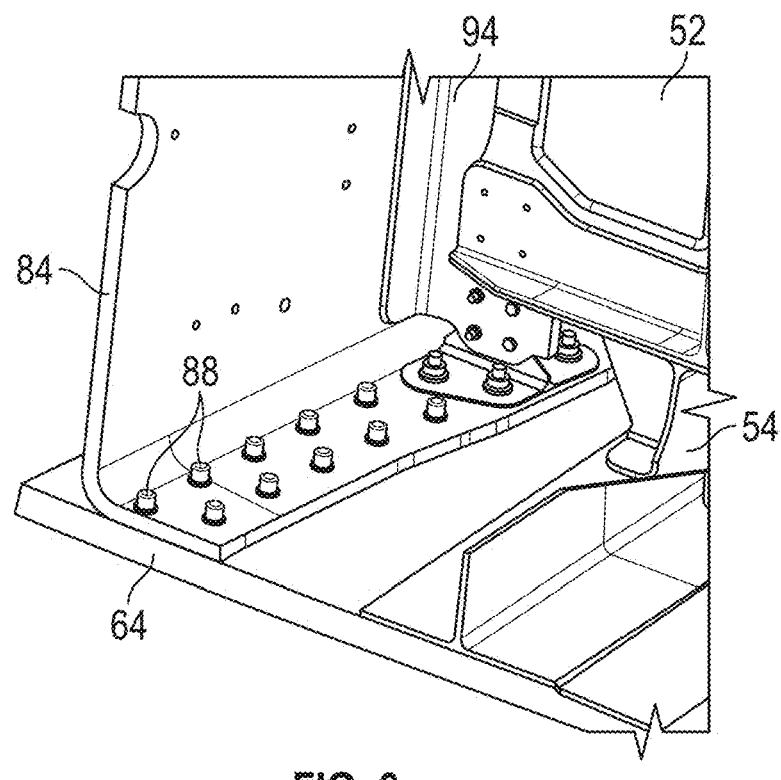
FIG. 6 is an enlarged view of a downstream spar attached to an example wing skin.
Figure 7:
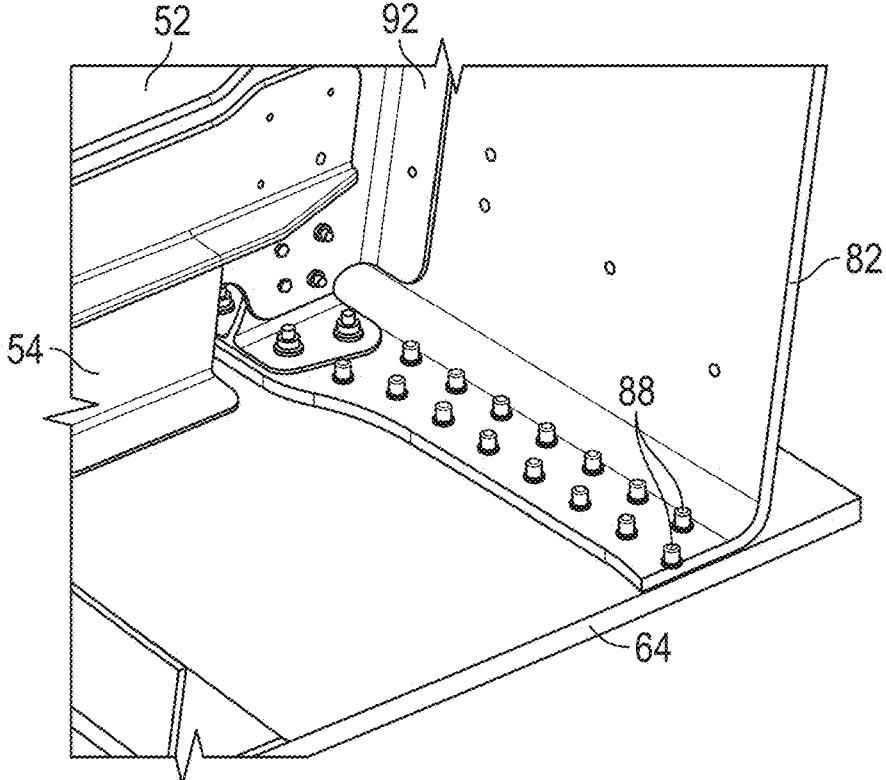
FIG. 7 is an enlarged view of an upstream spar attached to the example wing skin of FIG. 6.

As shown in FIGS. 3-4, an upstream end of each of the first rib portions 52 is secured to an upstream spar 82 and a downstream end of each of the first rib portions 52 is secured to a downstream spar 84. The upper wing skin 60 is then secured to the first rib portions 52 and the upstream and downstream spars 82 and 84 with at least one of fasteners or adhesive. Additionally, an upstream flange 92 and a downstream flange 94 may be utilized for securing the upstream and downstream ends of the first rib portions 52 to the upstream and downstream spars 82 and 84, respectively, as shown in FIGS. 6-7.

Figure 9:
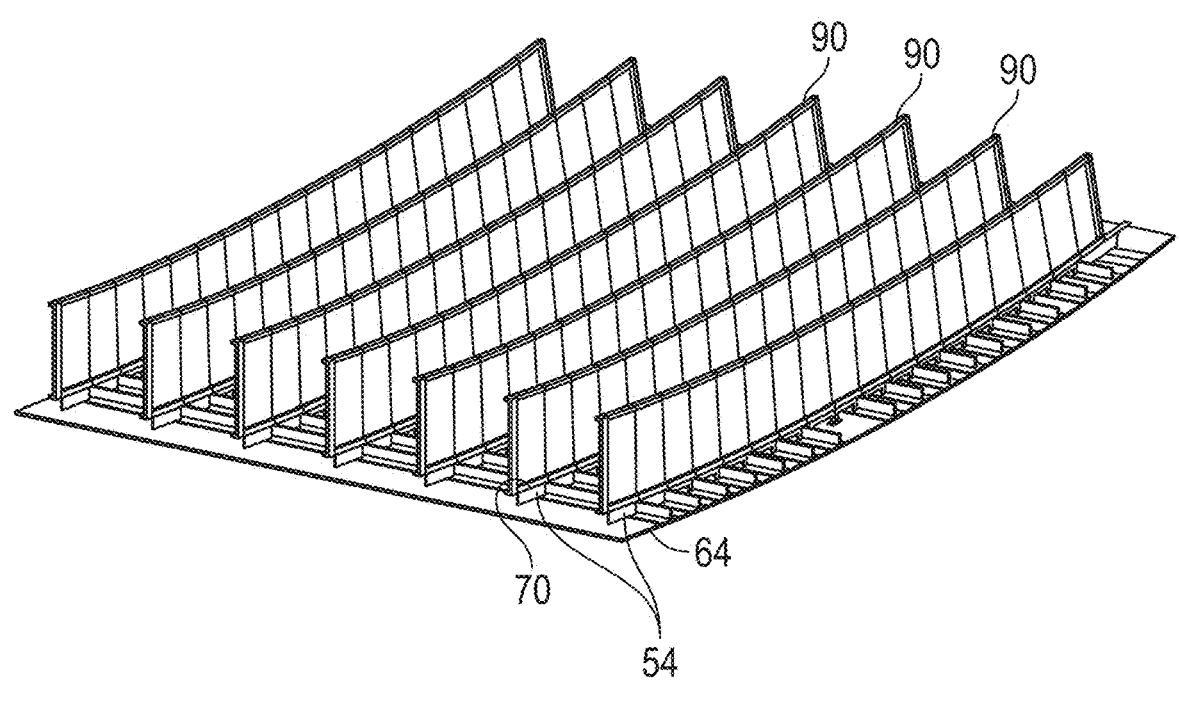
FIG. 9 is a top perspective view of a strong back attached to a second rib portion.

As shown in FIG. 9, each of the second rib portions 54 are attached to a corresponding one of a plurality of strong backs 90 prior to being attached the lower wing skin 64. The strong backs 90 follow a profile or contour of the first rib engagement surface 68 on the first rib portion 52 to ensure that the second rib portion 54 maintains the appropriate profile to mate with the first rib portion 52 and avoid the second rib portion 54 form being distorted by the lower wing skin 64.

Figure 5:
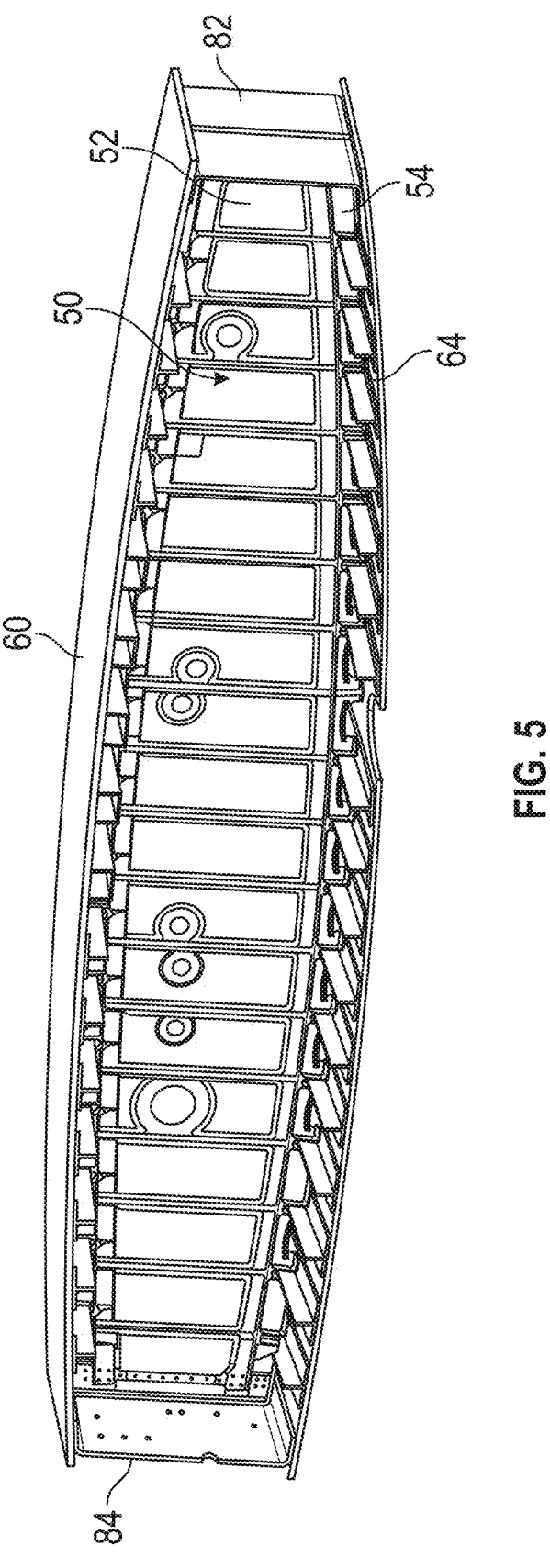
FIG. 5 is a top perspective view of the partially assembled wing of FIG. 3 with the first and second rib portions secured together.
Figure 8:
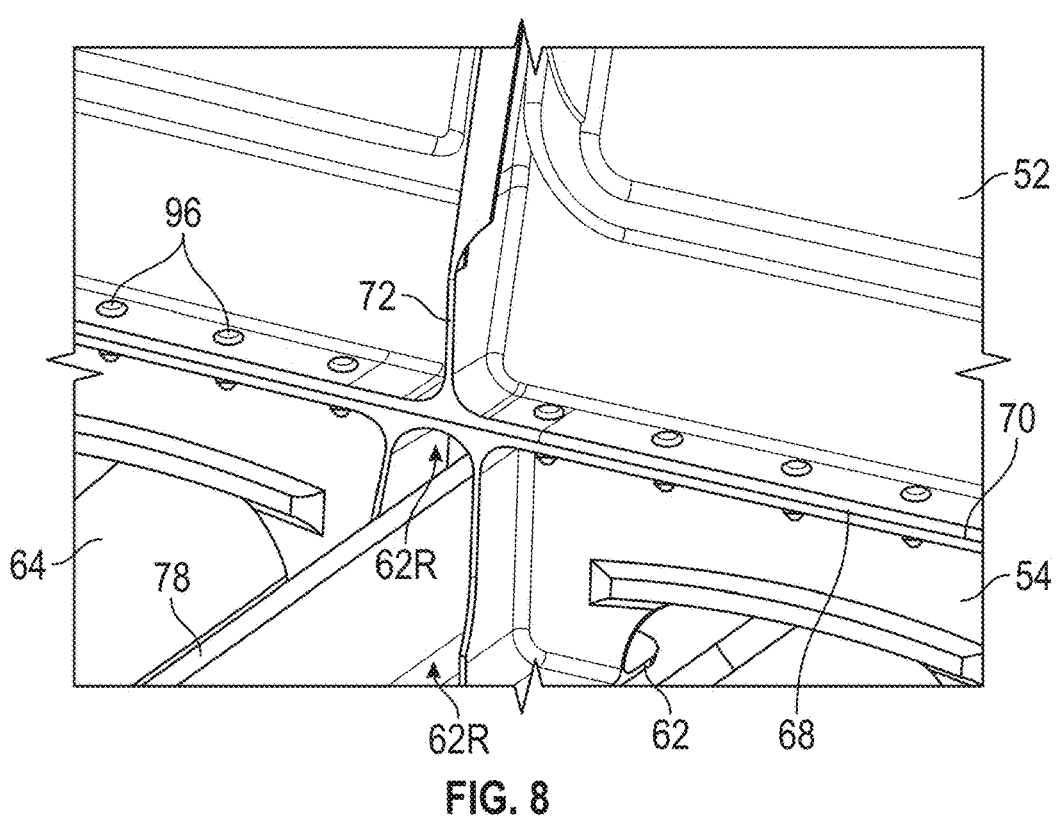
FIG. 8 is an enlarged view of an attachment between a first rib portion and a second rib portion.

Once the lower wing skin 64 is attached to the second rib portions 54, the strong backs 90 can then be removed from the second rib portions 54. The upper wing skin 60 with the first rib portions 52 and the upstream and downstream spars 82 and 84 can then be brought together with the lower wing skin 64 and the second rib portions 54 such that the first rib engagement surfaces 68 on each of the first rib portions 52 aligns with and engages corresponding ones of the second rib engagement surfaces 70 on the second rib portions 54 as shown in FIGS. 5 and 8. Fasteners 96 then extend through the first and second separation flanges 66A and 66B to secure the first and second rib portions 52 and 54 to each other. The upstream and downstream spars 82 and 84 can then be secured to the lower wing skin 64 with fasteners 88 as shown in FIGS. 6-7 similar to the upstream and downstream spars 82 and 84 being secured to the upper wing skin 60.

FIG. 10 illustrates a flowchart of an example method 100 of assembly of the wing 24 utilizing the ribs 50. As discussed above, the first and second rib portions 52 and 54 can be formed from a single unitary rib structure by mechanically separating the single unitary rib structure along a separation rib to form the first and second separation flanges 66A and 66B. The method 100 begins at block 102 ("Secure First Rib Portions to Spars") by securing the first rib portions 52 of each of the ribs 50 to the upstream and downstream spars 82 and 84 with at least one of the fasteners 88 or adhesive. The method 100 then proceeds to block 104

At block 104 ("Secure Upper Wing Skin"), the upper wing skin 60 is secured to the first rib portions 52 and the upstream and downstream spars 82 and 84 with at least one of fasteners or adhesive. The upper wing skin 60 can be shimmed relative to at least one of the first rib portion and the upstream and downstream spars 82 and 84 to ensure proper alignment. Because the lower wing skin 64 is not yet attached, the interface between the upper wing skin engagement surface 58 and the upper wing skin 60 can be easily accessed between the first rib portions 52. The method 100 then proceeds to block 106.

At block 106 ("Secure Lower Wing Skin"), the lower wing skin 60 is attached to the second rib portions 54. Prior to attaching the lower wing skin 64 to the second rib portions 54, each of the second rib portions 52 are attached to the strong backs 90 along their second rib engagement surfaces 70. The strong backs 90 ensure that the second rib portions 54 maintain a curvature or profile that will mate with the first rib engagement surfaces 68 on the first rib portions 52. However, depending on the ability of the second rib portions 54 to resist deflection from the lower wing skin 64, the strong backs 90 may not need to be attached to the lower rib portions 54.

Once the strong backs 90 are attached to the second rib portions 54, the lower wing skin 64 is attached to the lower wing skin engagement surface 62 with at least one of the fasteners 88 or adhesive. The method 100 then proceeds to block 108.

At block 108 ("Secure First and Second Rib Portions"), the first rib portions with the upstream and downstream spars 82 and 84 and the upper wing skin 60 are brought together with the second rib portions 54 and the lower wing skin 64 to mate the first and second rib engagement surfaces 68 and 70. The first and second rib portions 52 and 54 can then be secured using the fasteners 96. The remainder of the wing 24 can be assembled at this point, such as s wing flaps, ailerons attached to the downstream spar 84, as well as forward and aft wing control surfaces.

The following Clauses provide example configurations of the aircraft 20, rib 50, and method 100 as shown in the FIGS.

Clause 1. A wing assembly, comprising: an upper wing skin; a lower wing skin; a plurality of ribs extending between an upstream spar and a downstream spar with the upper wing skin and the lower wing skin at least partially enclosing the plurality of ribs, wherein each of the plurality of ribs include: a first rib portion having an upper wing skin engagement surface and a first rib engagement surface located on an opposite side of the first rib portion for the upper wing skin engagement surface; and a second rib portion having a lower wing skin engagement surface and a second rib engagement surface, wherein the second rib engagement surface on the second rib portion is secured to the first rib engagement surface on the first rib portion with a plurality of rib fasteners.

Clause 2. The wing assembly of clause 1, wherein the upstream spar is fixed to the upper wing skin and the lower wing skin and the downstream spar is fixed relative to the upper wing skin and the lower wing skin.

Clause 3. The wing assembly of clauses 1-2, wherein the first rib engagement surface is directly in contact with the second rib engagement surface.

Clause 4. The wing assembly of clauses 1-3, wherein the first rib engagement surface and the second rib engagement surface follow a non-linear profile.

Clause 5. The wing assembly of clauses 1-4, wherein the first rib engagement surface and the second rib engagement surface are complementary surfaces formed from mechanically separating a single unitary rib into the first rib portion and the second rib portion.

Clause 6. The wing assembly of clauses 1-5, including a first plurality of shims between the first rib portion and the upper wing skin.

Clause 7. The wing assembly of clauses 1-6, including a second plurality of shims between the second rib portion and the lower wing skin.

Clause 8. The wing assembly of clauses 1-7, wherein the lower wing skin includes a plurality of structural features that extends transversely to the second rib portion and the second rib portion at least partially defines a recess that forms a discontinuity along the lower wing skin engagement surface for accepting a portion of a corresponding one of the plurality of structural features.

Clause 9. The wing assembly of clauses 1-8, wherein the upper wing skin includes a plurality of structural features that extends transversely to the first rib portion and the first rib portion at least partially defines a recess that forms a discontinuity along the upper wing skin engagement surface for accepting a portion of a corresponding one of the plurality of structural features.

Clause 10. The wing assembly of clauses 1-9, wherein the first rib portion includes a transverse rib aligned with the recess in the second rib portion.

Clause 11. The wing assembly of clauses 1-10, including a plurality of fasteners securing the first rib portion to the second rib portion.

Clause 12. An airplane, comprising: a fuselage; a pair of wings extending from the fuselage, wherein each of the pair of wings include: an upper wing skin; a lower wing skin; a plurality of ribs extending between an upstream spar and a downstream spar with the upper wing skin and the lower wing skin at least partially enclosing the plurality of ribs, wherein each of the plurality of ribs include: a first rib portion having an upper wing skin engagement surface and a first rib engagement surface located on an opposite side of the first rib portion for the upper wing skin engagement surface; and a second rib portion having a lower wing skin engagement surface and a second rib engagement surface, wherein the second rib engagement surface on the second rib portion is secured to the first rib engagement surface on the first rib portion with a plurality of rib fasteners.

Clause 13. The airplane of clause 12, wherein the lower wing skin includes a plurality of structural features that extends transversely to the second rib portion of each of the plurality of ribs and the second rib portion of each of the plurality of ribs at least partially defines a recess that forms a discontinuity along the lower wing skin engagement surface for accepting a portion of a corresponding one of the plurality of structural features.

Clause 14. The airplane of clauses 12-13, wherein the upper wing skin includes a plurality of structural features that extends transversely to the first rib portion of each of the plurality of ribs and the first rib portion of each of the plurality of ribs at least partially defines a recess that forms a discontinuity along the upper wing skin engagement surface for accepting a portion of a corresponding one of the plurality of structural features.

Clause 15. The airplane of clauses 12-14, wherein the first rib portion includes a transverse rib aligned with the recess in the second rib portion.

Clause 16. A method of assembling a wing assembly, the method comprising: securing a plurality of first rib portions to an upstream spar and a downstream spar; securing an upper wing skin to an upper skin engagement surface on each of the plurality of first rib portions, the upstream spar, and the downstream spar; securing a lower wing skin to a lower skin engagement surface on each of a plurality of second rib portions; and securing a first rib engagement surface on each of the plurality of first rib portions to a corresponding second rib engagement surface on each of the plurality of second rib portions.

Clause 17. The method of clause 16, wherein securing the upper wing skin to the upper skin engagement surface on each of the plurality of first rib portions includes shimming the upper wing skin relative to the upper skin engagement surface on each of the plurality of first rib portions.

Clause 18. The method of clauses 16-17, wherein securing the lower wing skin to the lower skin engagement surface on each of the plurality of second rib portions includes shimming the lower wing skin relative to the lower skin engagement surface on each of the plurality of second rib portions.

Clause 19. The method of clauses 16-18, including securing each of the plurality of second rib portions to a corresponding one of a plurality of strong backs prior to attaching the lower wing skin to the lower skin engagement surface on the plurality of second rib portions.

Clause 20. The method of clauses 16-19, forming one of the plurality of first rib portions and a corresponding one of the plurality of second rib portions from a single unitary rib structure by mechanically separating the single unitary rib structure along a separation rib.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

What is claimed is:

1. A system comprising:
a single unitary rib structure that is mechanically separated along a separation rib to form a first rib portion and a second rib portion which corresponds to the first rib portion; and
a wing assembly, comprising:
an upper wing skin;
a lower wing skin;
a plurality of ribs extending between an upstream spar and a downstream spar with the upper wing skin and the lower wing skin at least partially enclosing the plurality of ribs, wherein the plurality of ribs include:
the first rib portion having an upper wing skin engagement surface and a first rib engagement surface located on an opposite side of the first rib portion for the upper wing skin engagement surface; and
the second rib portion that is separate and distinct from the first rib portion, wherein the second rib portion is secured to the first rib portion, wherein the second rib portion has a lower wing skin engagement surface and a second rib engagement surface, wherein the second rib engagement surface on the second rib portion is secured to the first rib engagement surface on the first rib portion with a plurality of rib fasteners.

2. The wing assembly of claim 1, wherein the upstream spar is fixed to the upper wing skin and the lower wing skin and the downstream spar is fixed relative to the upper wing skin and the lower wing skin.

3. The wing assembly of claim 1, wherein the first rib engagement surface and the second rib engagement surface are complementary surfaces formed from mechanically separating the single unitary rib into the first rib portion and the second rib portion.

4. The wing assembly of claim 1, including a plurality of fasteners securing the first rib portion to the second rib portion.

5. The wing assembly of claim 1, wherein the first rib portions and the second rib portions are separated by plasma cutting, electrical discharge machining, or water jet cutting along a separation rib.

6. The wing assembly of claim 1, wherein the first rib engagement surface is directly in contact with the second rib engagement surface.

7. The wing assembly of claim 6, wherein the first rib engagement surface and the second rib engagement surface follow a non-linear profile.

8. The wing assembly of claim 1, wherein the lower wing skin includes a plurality of structural features that extends transversely to the second rib portion and the second rib portion at least partially defines a recess that forms a discontinuity along the lower wing skin engagement surface for accepting a portion of a corresponding one of the plurality of structural features.

9. The wing assembly of claim 8, wherein the upper wing skin includes a plurality of structural features that extends transversely to the first rib portion and the first rib portion at least partially defines a recess that forms a discontinuity along the upper wing skin engagement surface for accepting a portion of a corresponding one of the plurality of structural features.

10. The wing assembly of claim 9, wherein the first rib portion includes a transverse rib aligned with the recess in the second rib portion.

11. A system comprising:
    a single unitary rib structure that is mechanically separated along a separation rib to form a first rib portion and a second rib portion which corresponds to the first portion; and
    an airplane, comprising:
    a fuselage;
    a pair of wings extending from the fuselage, wherein each of the pair of wings include:
        an upper wing skin;
        a lower wing skin;
        a plurality of ribs extending between an upstream spar and a downstream spar with the upper wing skin and the lower wing skin at least partially enclosing the plurality of ribs, wherein the plurality of ribs include:
            the first rib portion having an upper wing skin engagement surface and a first rib engagement surface located on an opposite side of the first rib portion for the upper wing skin engagement surface; and
        the second rib portion that is separate and distinct from the first rib portion, wherein the second rib portion is secured to the first rib portion, wherein the second rib portion has a lower wing skin engagement surface and a second rib engagement surface, wherein the second rib engagement surface on the second rib portion is secured to the first rib engagement surface on the first rib portion with a plurality of rib fasteners.

12. The airplane of claim 11, wherein the first rib portions and the second rib portions are separated by plasma cutting, electrical discharge machining, or water jet cutting along a separation rib.

13. The airplane of claim 11, wherein the lower wing skin includes a plurality of structural features that extends transversely to the second rib portion of each of the plurality of ribs and the second rib portion of each of the plurality of ribs at least partially defines a recess that forms a discontinuity along the lower wing skin engagement surface for accepting a portion of a corresponding one of the plurality of structural features.

14. The airplane of claim 13, wherein the upper wing skin includes a plurality of structural features that extends transversely to the first rib portion of each of the plurality of ribs and the first rib portion of each of the plurality of ribs at least partially defines a recess that forms a discontinuity along the upper wing skin engagement surface for accepting a portion of a corresponding one of the plurality of structural features.

15. The airplane of claim 14, wherein the first rib portion includes a transverse rib aligned with the recess in the second rib portion.

16. A method of assembling a wing assembly, the method comprising:
    mechanically separating a single unitary rib structure along a separation rib to form first rib portions and second rib portions;
    securing the first rib portions to an upstream spar and a downstream spar;
    securing an upper wing skin to an upper skin engagement surface on each of the first rib portions, the upstream spar, and the downstream spar;
    securing a lower wing skin to a lower skin engagement surface on each of the second rib portions;
    securing a first rib engagement surface on each of the plurality of first rib portions to a corresponding second rib engagement surface on each of the plurality of second rib portions; and
    securing the first rib portions to the second rib portions.

17. The method of claim 16, including securing each of the second rib portions to a corresponding one of a plurality of strong backs prior to attaching the lower wing skin to the lower skin engagement surface on the second rib portions.

* * * * *